United States Patent Office 3,806,421
Patented Apr. 23, 1974

3,806,421
AMYLASE INHIBITOR AND METHOD OF
PRODUCING THE SAME
Seinosuke Ueda and Yojiro Koba, Fukuoka-ken, Japan, assignors to Hayashibara Biochemical Laboratories, Incorporated, Okayama-ken, Japan
No Drawing. Filed Mar. 29, 1972, Ser. No. 239,346
Claims priority, application Japan, May 31, 1971,
46/36,969
Int. Cl. C12d 13/06; C07g 7/02
U.S. Cl. 195—80 R
2 Claims

ABSTRACT OF THE DISCLOSURE

An inhibitor for amylases has been recovered from the culture broth of Streptomyces flavochromogenes No. 280. It is a peptide which yields glutamic acid, aspartic acid, serine, and alanine upon hydrolysis, is stable up to 100° C. for 15 minutes in 1 N hydrochloric acid, but is rapidly inactivated in boiling 1 N sodium hydroxide solution. It is partially soluble in methanol, ethanol and acetone and practically insoluble in many other organic solvents. The inhibitor retards or prevents the decomposition of starch to glucose by amylases of several known types.

---

This invention relates to an amylase inhibitor and to a method of preparing the same.

More specifically, the invention relates to a peptide capable of inhibiting amylase. While amylase inhibitors have been known heretofore, an amylase inhibitor which is a peptide was not found prior to this invention.

It has been discovered that a newly found microorganism isolated from a soil specimen Streptomyces flavochromogenes No. 280, produces an extracellular peptide in a conventional culture broth, and that the culture broth and the peptide recovered from the broth have the ability of inhibiting amylase activity. The microorganism has been deposited with the Fermentation Research Institute, Agency of Industrial Science and Technology, in Chiba, Japan, is covered by Receipt No. 934 of the Institute, and has received accession number FERM-P No. 934.

The new strain has the following characteristic properties:

(1) MORPHOLOGICAL CHARACTERISTICS

Growth of mycelium is abundant. Vegetative mycelium remains undivided. Sporangia are not produced. Growth of aerial mycelium is abundant. Conidiospores are produced in chains on aerial mycelium. Therefore the present strain belongs to the genus streptomyces of the family Streptomycetaceae. Conidia-producing mycelium is branched monopodially but not in the form of whorls. Usually spore chains on aerial mycelium are flexuous but not spiral, sometimes the terminal portion of aerial mycelium is loop-shaped. Therefore the present strain belongs to Group 1 of the genus streptomyces.

(2) PHYSIOLOGICAL CHARACTERISTICS (a) Growth temperature: Grows between 20° and 50° C. Does not grow at 60° C.
(b) Oxygen demand: Aerobic, but not microaerophilic.
(c) Action against protein:
   Liquefaction of gelatin: (+) weak
   Coagulation and peptonization of milk: (−)
   Tyrosinase: (±)
   Production of hydrogen sulfide: (+)
   Production of indole: (−)
   Production of ammonia: (+).
(d) Hydrolysis of starch: (+).
(e) Hydrolysis of cellulose: (+).

(f) Utilization of sugars:
   Mannitol, +; rhamnose, +; inositol, −; mannose, ++; maltose, ++; salicin, +; α-glucose, ++; α-xylose, +; sucrose, +; fructose, ++; dulcitol, −; inulin, ++; l-arabinose, −; lactose, +; raffinose, galactose, ++; sorbitol, −.
(g) Reduction of nitrate: (+).

(3) CULTURAL CHARACTERISTICS ON VARIOUS MEDIA (MYCELIUM GROWING ON MEDIA IS VEGETATIVE MYCELIUM)

(a) Czapek's agar: Growing mycelium is poor, white. Aerial mycelium is produced slightly, white. Soluble pigment is not formed as fas as observed.
(b) Asparagine glucose agar: Growing mylecium changes from white to faint yellow, further to brown. Colonies are umbonate. Aerial mycelium changes from white to gray, further to greenish gray. Soluble pigment is brown.
(c) Czapek's solution: Good growth. Growing mycelium is whitish yellow. Broth is clear with sediment and thin pellicle on the surface of culture. Aerial mycelium is white to faint yellow. Soluble pigment is yellow.
(d) Agar medium: Growing mycelium changes from colorless to faint yellow. Colonies are umbonate. Aerial mycelium grows late and is white. Soluble pigment is brown.
(e) Nutrient agar: Growing mycelium is white to creamy white. Aerial mycelium is produced slightly and changes from white to gray. Soluble pigment is brown.
(f) Peptone-glucose agar: Growing mycelium is slightly yellow to yellow. Colonies are raised. Aerial mycelium changes from white to gray. Soluble pigment is slightly brown.
(g) Gelatin stab: Liquefies in crateriform but does not liquefy the whole. Growing mycelium is poor, slightly cream-colored. Aerial mycelium and soluble pigment is not produced as far as observed.
(h) Starch agar: Growing mycelium is cream-colored. Aerial mycelium is white and does not grow substantially. Soluble pigment is not produced as far as observed.
(i) Tyrosine agar: Growing mycelium is colorless to cream-colored. Colonies are raised. Aerial mycelium is white. Soluble pigment is dark brown.
(j) Milk: Good growth. Forms yellow mycelial mat. Produces white aerial mycelium on mycelial mat. Soluble pigment is brown. Does not coagulate as far as observed. Peptonizes slowly. Does not reduce litmus.
(k) Potato sucrose agar: Growing mycelium is yellow. Aerial mycelium is white to slightly yellow, thereafter produces gray dots. Soluble pigment is brown.
(l) Potato plug: Growing mycelium is cream-colored. Forms marked raise. Aerial mycelium is white to grayish milk-white and is produced in substantial amounts.

Because of the formation of a brownish, soluble pigment in an organic medium, and because of its culture characteristics, the new microorganism is considered to belong to the B group of Streptomyces, Group 1.

The 7th edition of Bergey's Manual of Determinative Bacteriology describes four species in B group of which three have at least some similarity with the new microorganism. The latter differs from known S. flavorchromogenes only in that it produces a brownish pigment while the known strains produce a gray pigment. S. flavochromogenes No. 280 of this invention is clearly distinguished from the known S. bikiniensis by the yellow color of its mycelium growing in milk, and the white color of its aerial mycelium, while the corresponding colors of the known strain are white and gray respectively. S. grise-

*ocarneus* is even farther from *S. flavochromogenes* No. 280 by its dark-brown to black growth in milk and by the rapid peptonization. Carbon assimilation also is entirely different.

The new microorganism is thus considered to be a novel strain of *Streptomyces flavorchromogenes*.

It can be cultured on conventional culture media providing the usual carbon and nitrogen sources together with necessary minor nutrients. It was found to grow rapidly, for example, on an aqueous medium of 2.5% soluble starch, 0.8% polypeptone, 0.5% yeast extract, and 0.5% NaCl at pH 7.2 with aeration at 40° C.

The sugar present was reduced to 40% of the initial amount after three days and disappeared within six days. The amylase inhibiting effect of the broth increased to a maximum in three days and was substantially constant thereafter for 2-3 days.

The inhibitor action was determined by comparing the amylase activity of a mixture of 0.1 ml. 1% glucoamylase (a commercial product of Amano Pharmaceutical Co.), 0.2 ml. of the solution to be tested, and 0.7 ml. water with that of a control not containing the tested solution. The amylase activity test was performed by adding 0.5 ml. of the above amylase mixture to 2.5 ml. 1% soluble starch solution and 0.5 ml. of a 0.2 M acetate buffer (pH 5.5), holding the reaction mixture so obtained at 40° C., and measuring the glucose content of 1 ml. reaction mixture every 15 minutes. The inhibition rate I was calculated from the equation $$I = 100 \frac{A-B}{A} \%$$

wherein A is the decomposition rate of the starch in the control, and B the decomposition rate in the presence of the tested solution. Conditions were chosen in such a manner that A was less than 80% because the rate of decomposition of starch by glucoamylase is a rectilinear function of time up to a decomposition rate of 80%.

A test specimen was considered to have an inhibitor activity of 10 units per milliliter when I was 50%. The inhibition rate was found to increase proportionally to the inhibitor concentration.

The broth as such can be employed for inhibiting amylase activity, but a purified inhibitor is readily recovered by passing the cell-free broth through a semipermeable membrane such as cellophane which retains enzyme protein and other impurities of high molecular weight or by precipitating the impurities by relatively small amounts of a water-soluble organic solvent such as acetone. The aqueous liquid containing the inhibitor is then partly evaporated, and the inhibitor is precipitated by means of adequate amounts of water soluble organic solvents and separated from inorganic salts. It may also be recovered in pure form by column chromatography in a known manner.

The following examples are further illustrative of the invention.

EXAMPLE 1

Five liters of the afore-described culture medium were inoculated with *S. flavochromogenes* No. 280, and the culture was kept at 40° C. with aeration until the amylase inhibitor activity of the broth reached a maximum approximately three days after inoculation.

3.5 liters of the broth were centrifuged to remove microbial cells, and the cell-free broth was dialyzed through a cellophane membrane. The aqueous outer solution of dialysis was evaporated in a vacuum to 1/100 of its initial volume and was then mixed with ethanol in an amount of 70% by volume. A precipitate formed, was filtered from the liquor, and washed with a small amount of water. The crude product so obtained weighed 200 mg.

The culture broth reached an inhibitor activity of 10 units per milliliter. The recovered solid had 28% of the inhibitor activity of the broth from which it was isolated.

It retained its activity at elevated temperature, and even for 15 minutes in 1 N hydrochloric acid at 100° C., but was quickly inactivated in 1 N sodium hydroxide solution at 100° C.

EXAMPLE 2

*S. flavochromogenes* No. 280 was cultured as described in Example 1 until the amylase inhibitor activity of the broth reached a maximum approximately three days after inoculation. The microbial cells were removed by centrifuging, and enough cold acetone was added to the cell-free broth to make the acetone concentration 50%, thereby precipitating protein impurities which were separated from a supernatant liquor by again centrifuging. The liquor was partly evaporated in a vacuum, and the concentrate was fractionated by chromatography on a column of Dowex 1 x 8 ion exchange resin. The fractions Nos. 35-45 having high inhibitor activity were collected, dialyzed through a cellophane membrane, and again subjected to chromatographic fractionation on a column of DEAE cellulose. The fractions having highest inhibitor activity were combined, dialyzed, and partly evaporated in a vacuum. The concentrate was mixed with cold methanol, and the precipitate so formed was dried. It was a powder having a specific inhibitor activity of 170.0 units per mg. nitrogen. The corresponding specific inhibitor activity of the cell-free culture broth was 11.0 units per mg. nitrogen.

The purified inhibitor was found to be a peptide whose acid hydrolyzate contained only four amino acids in amounts detectable by paper chromatography: glutamic acid, aspartic acid, serine, and alanine. The molecular weight of the inhibitor was found to be approximately 1,000 to 5,000, when tested by the molecular sieve method. It is partially soluble in methanol, ethanol and acetone, and practically insoluble in many other organic solvents. It gives the color reaction characteristic of peptides in the Cu-Folin test. It is not inactivated by trypsin, pepsin, or pronase.

Glucoamylase is inhibited by the peptide as described above whether the enzyme is obtained from Rhizopus or Aspergillus. The peptide also inhibits the activity of bacterial saccharogenic amylase and of salivary amylase, but has almost not effect on most bacterial α-amylases, the α- and β-amylase of malt, the β-amylase of sweet potatoes, isoamylase of bacterial origin (Aerobacter, Escherichia, Pseudomonas, Streptomyces) and fungal α-amylase (Aspergillus).

The amylase inhibitor of the invention is non-toxic in effective amounts, and may thus be employed in food containing starch for preventing accidental decomposition of the latter to glucose in food for diabetics and in other starch-bearing compositions in which the absence of glucose is desired.

In the starch hydrolysis industry, there are demands for syrups having specific sugar compositions, which contain maltose in a larger amount than obtained by usual methods and a reduced amount of glucose only sufficient for sweetness, or a limited amount of glucose, but no dextrin of high molecular weight. These syrups are difficult to obtain by conventional enzymatic saccharification of starch or saccharification with mineral acids, but they can be obtained by using combinations of different kinds of amylase.

When combination of amylases are used, complicated procedures are necessary to control the saccharification reaction and 2 or 3 saccharification steps are needed. In addition, the enzyme must be inactivated during its reaction or the same enzyme must be added to the reaction system again after the inhibition.

If the amylase inhibitor of the invention is used during starch hydrolysis, syrups having the desired glucose content and sugar composition can be obtained very easily any of the above troubles.

The processes for producing the syrups described above are illustrated by the following examples.

EXAMPLE 3

A 40% starch suspension was prepared from sweet potato starch and water and adjusted at pH 6.0. The suspension was mixed with bacterial α-amylase in an amount of 15 units/gram starch, and the mixture was poured into boiling water with stirring.

After the starch was liquefied, the solution was quickly cooled to 50° C., mixed with 1.0 unit of glucoamylase obtained from Rhizopus, 2.0 units of β-amylase of wheat bran and 10 units of isoamylase obtained from Pseudomonas, respectively per gram starch, and adjusted to pH 5.0 for saccharification.

When the desired glucose content was reached, 2.0 units of the present amylase inhibitor per gram starch were added to inhibit the amylase activity only. Other saccharification reactions were continued for further 40 hours.

The saccharification solution was then decolorized with active charcoal, purified with an ion exchange resin and concentrated. A high maltose starch syrup with limited glucose content was obtained in a yield of 90% on a dry basis. The saccharification rate and the sugar composition of two batches, to which the inhibitor was added after three and eight hours of saccharification respectively, are shown in the table below.

| Inhibitor added after— | Sacch'n rate (D.E.) | Composition, percent, on dry basis | | | |
|---|---|---|---|---|---|
| | | Glucose | Maltose | Maltotriose | Dextrin |
| 3 hours | 67.1 | 25.0 | 50.2 | 12.7 | 12.1 |
| 8 hours | 73.3 | 40.0 | 41.5 | 11.3 | 7.2 |

EXAMPLE 4

A suspension was prepared from 10 kg. sweet potato starch, 15 units per gram starch of bacterial α-amylase and 11 liters of water adjusted to pH 6.0, and poured into 5 liters of water at 90° C.

The mixture was kept 20 minutes at 90° C. heated to 120° C. for 5 minutes under pressure, was quickly cooled to 55° C. and mixed with 2 units of glucoamylase obtained from Rhizopus and 5 units of bacterial α-amylase, respectively per gram starch. The saccharification was carried out at 55° C.

When the desired glucose content was reached, 4.0 units of the amylase inhibitor per gram starch were added to inhibit the glucoamylase activity only. Other saccharification reactions were continued for further 10 hours.

The saccharification solution was decolorized with active charcoal, purified with an ion exchange resin and concentrated. The syrup obtained in a yield of 90% on a dry basis contained a limited amount of glucose and a small amount of high molecular weight dextrin.

The saccharification rate and the composition of two batches, to which the inhibitor was added after two and five hours respectively, sugars were as follows:

| Inhibitor added after— | Sacch'n rate (D.E.) | Composition, percent, on dry basis | | | |
|---|---|---|---|---|---|
| | | Glucose | Maltose | Saccharides (A) | Saccharides (B) |
| 2 hours | 56.4 | 30.0 | 14.3 | 45.4 | 10.3 |
| 5 hours | 69.2 | 50.0 | 10.2 | 35.3 | 4.5 |

What is claimed is:

1. A method of producing an amylase inhibitor which comprises culturing *Streptomyces flavochromogenes* FERM-P 934 on an aqueous medium containing sources of assimilable carbon and nitrogen and minor necessary nutrients until an amylase inhibitor accumulates in said medium, and recovering the accumulated inhibitor from said medium.

2. A peptide prepared by the method set forth in claim 1, said peptide having an inhibiting effect on the amylase activity of glucoamylase, bacterial saccharogenic amylase, and salivary amylase, but lacking substantial inhibiting effect on the α- and β-amylase of malt, the β-amylase of sweet potatoes, and α-amylase of Aspergillus, said peptide, upon acid hydrolysis, yielding only glutamic acid, aspartic acid, serine, and alanine in amounts detectable by paper chromatography, said peptide having a molecular weight of approximately 1000 to 5000 and being partly soluble in methanol, ethanol, and acetone, said peptide retaining the amylase inhibiting activity thereof after 15 minutes in one-normal aqueous hydrochloric acid solution at 100° C., but being rapidly inactivated in one normal aqueous sodium hydroxide solution at 100° C., and being not inactivated by trypsin, pepsin, or pronase.

References Cited

UNITED STATES PATENTS 3,629,404  12/1971  Florent et al. ____ 195—80 R X

OTHER REFERENCES

Niwa et al.: Agricultural and Biological Chemistry, vol. 34, No. 6, pp. 966–968 (1970).

LIONEL M. SHAPIRO, Primary Examiner

U.S. Cl. X.R.

195—31 R; 260—112 R; 424—115; 426—321